United States Patent [19]

Hodgetts

[11] 4,024,621

[45] May 24, 1977

[54] KEG ORIENTING AND TRANSFERRING APPARATUS

[75] Inventor: Ernest J. Hodgetts, Spruce Grove, Canada

[73] Assignee: The Molson Companies Limited, Rexdale, Canada

[22] Filed: Aug. 10, 1976

[21] Appl. No.: 713,117

[30] Foreign Application Priority Data

May 12, 1976 Canada .............................. 252376

[52] U.S. Cl. .................................. 29/822; 29/700; 29/427; 53/381 A; 113/1 K
[51] Int. Cl.² ...................................... B23P 19/04
[58] Field of Search ................ 29/426, 427, 208 B, 29/208 R, 200 A, 200 D, 200 R, 200 P; 113/1 K; 53/381 A; 221/171, 173; 198/236, 244

[56] References Cited

UNITED STATES PATENTS

| | | | |
|---|---|---|---|
| 3,174,650 | 3/1965 | Bellato | 408/67 X |
| 3,243,936 | 4/1966 | Anderson | 53/381 A |
| 3,613,332 | 10/1971 | Davis | 53/381 A |
| 3,906,610 | 9/1975 | Hodgetts | 29/427 X |

Primary Examiner—Victor A. DiPalma
Attorney, Agent, or Firm—Anthony J. Casella

[57] ABSTRACT

The present invention relates to apparatus for removing an identification disc from one end of an aluminium keg and thereafter transferring the latter to other apparatus (not the subject of the present invention) which will remove a bung from the side of the keg. The apparatus includes a selectively rotatable cradle which carries the keg, drive rollers for rotating the cradle about its central longitudinal axis; a cup for sensing and removing the disc; and means engagable with the other end of the keg to actuate the drive rollers or to rotate the cradle.

12 Claims, 7 Drawing Figures

KEG ORIENTING AND TRANSFERRING APPARATUS

This invention relates to keg orienting and transferring apparatus i.e. apparatus for receiving kegs in either inverted or obverse condition and arranging for them to be oriented prior to transfer from the said apparatus to other apparatus.

Draught beer for the hotel and tavern trade is normally sold in aluminium kegs. Such kegs are provided with a filling hole located in the side of the keg and closed by a wooden bung, as well as a tapping spigot in one end of the keg.

Additionally, the only indicia applied to the keg for identifying the name of the brewer and the type of beer is an identification tab or disc which is positioned on the outer end of the tapping spigot.

As will be appreciated, when the kegs are empty they are returned to the brewery for sterilization before refilling and resale. Often as not Brewery "A" will receive empty kegs showing a brand of Brewery "B" on the disc so that this must be removed prior to the keg being refilled by Brewery "A" and this is preferably done prior to sterilization of the keg. Moreover, and prior to sterilization, the wooden bung must be removed. One such apparatus for removing the bungs is that described and illustrated in U.S. Pat. No. 3,906,610 which issued on Sept. 23rd, 1975, the inventor of the latter being the same as that in the instant application.

Briefly, in U.S. Pat. No. 3,906,610, empty or used aluminum kegs having a wooden bung therein are presented to a cradle and means are provided to rotate each keg about its central longitudinal axis until the bung is located substantially above an auger which then moves into engagement with said bung and thereby removes it from the keg whereupon the latter is then ejected from the de-bunging apparatus.

However, and as is known in the brewing art, the top of a keg has a different shape to its bottom i.e. the top is dished or concave all over whereas the bottom, which is otherwise dished or concave, has a radially extending well which is adapted to receive any sediment settling on the bottom of the keg. Hence, means must be provided to ensure that the de-bunging apparatus such as that shown in the abovementioned Patent receives empty kegs with the tops always facing one direction and the bottoms always facing the opposite direction. This is because such de-bunging apparatus includes the aforesaid means for rotating each keg about its central longitudinal axis and which means are engagable with the top and bottom of the keg. Because the shape of the top of the keg differs from the shape of the bottom it will be quite obvious that the keg rotating means located at one end of the keg cannot be identical to the rotating means located at the other end of the keg and one of the reasons that the present invention has been brought about is the need to ensure that the kegs will always be oriented so as to face in the same direction when they are presented to the de-bunging apparatus. Another reason is to provide means whereby the identification discs can be quickly and easily removed.

Thus, it is the object of the present invention to provide apparatus which will ensure correct presentation or orientation and transfer of the empty kegs to further apparatus such as the abovementioned de-bunging apparatus and which will also remove the abovementioned identification discs.

Figure 1:
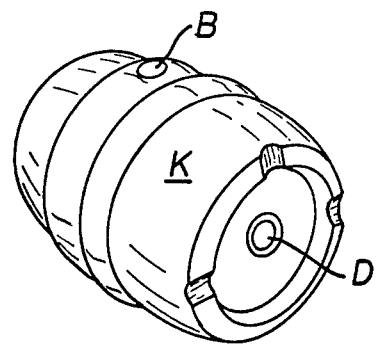
FIG. 1 is a perspective view of one end of a keg showing a brew identification disc.

Referring to the drawings, it will be seen from FIG. 1 that one end i.e. the top, of a typical aluminum beer keg K is dished or concave all over and is provided with a plastic identification tab or disc D which is positioned over the central tapping spigot. The keg is also provided with a wooden bung B in its periphery.

Figure 2:
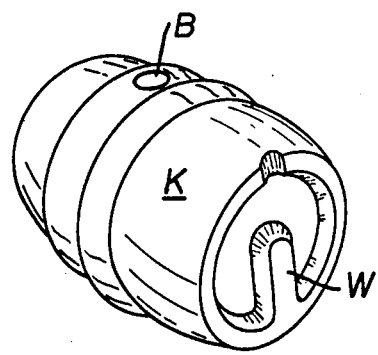
FIG. 2 is a perspective view of the opposite end of such a keg.

The opposite or bottom end of the keg K is shown in FIG. 2 where, as will be seen, it has a different shape to the top. In other words, the bottom although being dished or concave, also has a radially extending well W adapted to receive any sediment settling on the bottom of the keg when the latter is in use.

Figure 3:
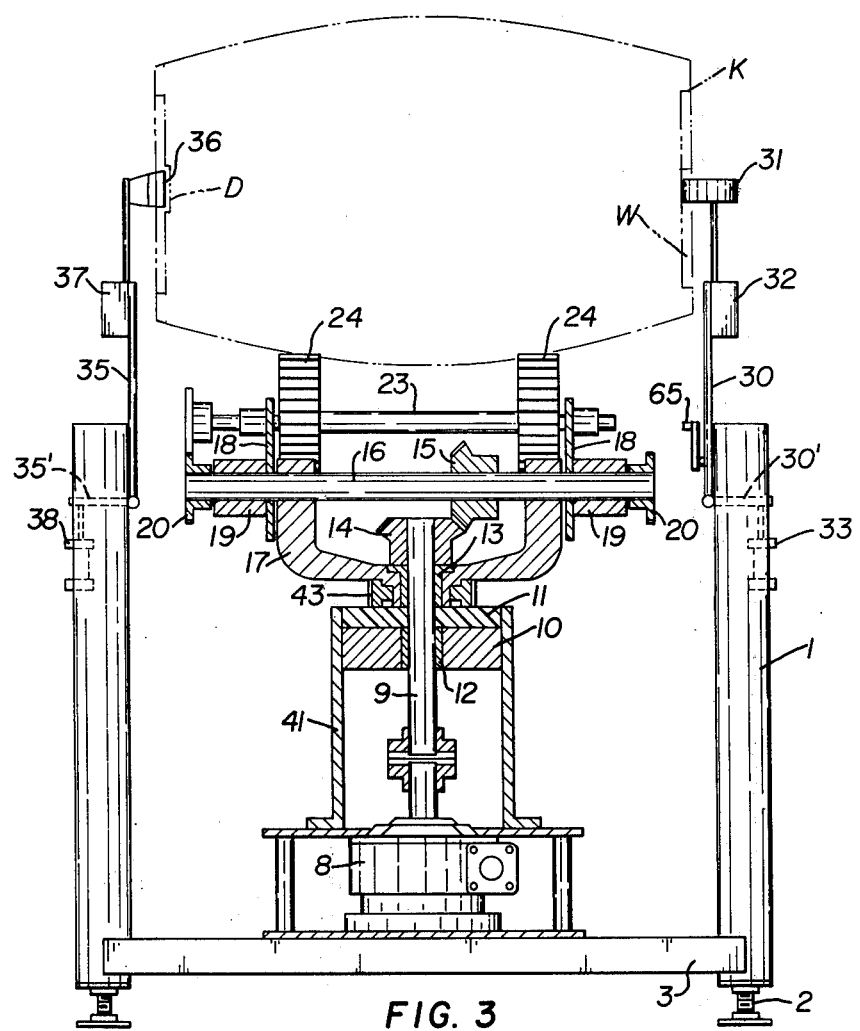
FIG. 3 is a part-sectional elevation of the article orienting and transferring apparatus.
Figure 4:
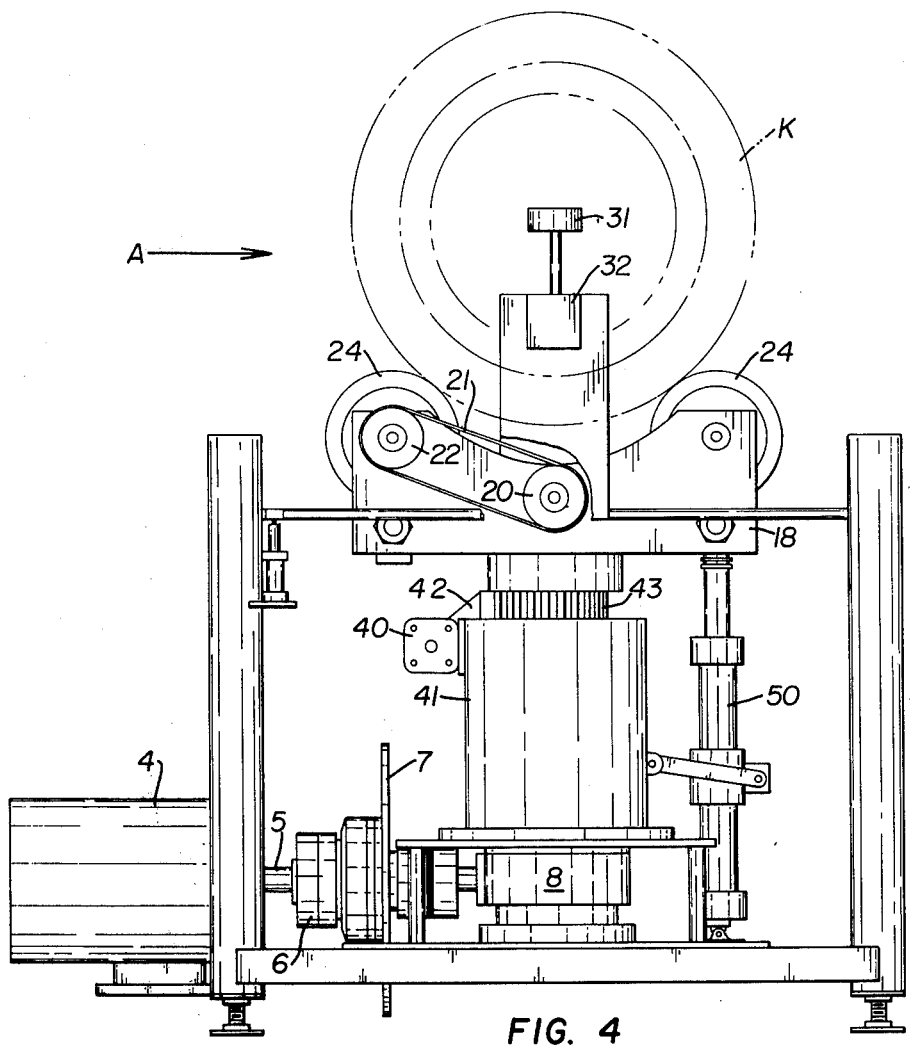
FIG. 4 is a side elevation showing the keg cradle in its mid-position.
Figure 5:
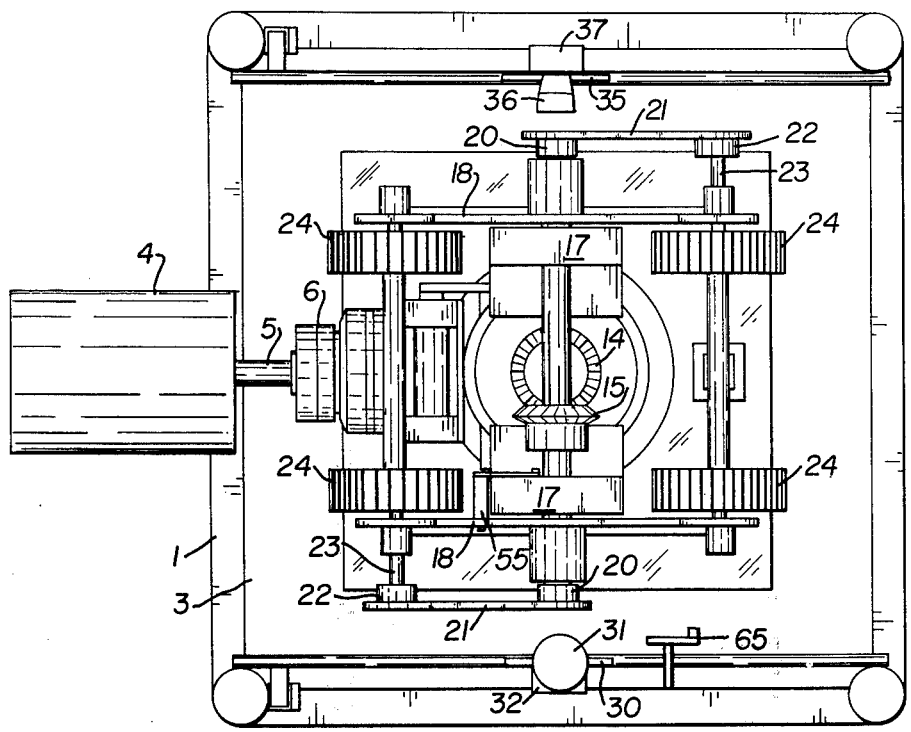
FIG. 5 is a plan view of FIGS. 3 and 4.

Referring now to FIG. 3, it will be seen that the keg orienting apparatus includes a frame 1 which can be vertically adjusted by means of adjustable feet 2. The frame supports a base-plate 3 and a motor 4 (FIGS. 4 and 5). A drive shaft 5 extends from the motor through a clutch 6, a clutch disc brake 7 to a worm gear reducer 8.

Extending upwardly from said reducer 8 is a vertical shaft 9 which passes through a main bushed support 10, a plastic bushing 11, bearings, 12, 13 and terminates at its upper end in a bevel gear 14 meshing with a horizontally mounted bevel gear 15.

Bevel gear 15 is mounted on a horizontally extending shaft 16 journalled in a U-shaped bracket 17. The ends of the shaft 16 pass through side plates 18 fast on bushings 19 and serve as the mountings for lower sprocket wheels 20. Each lower sprocket wheel 20, via a chain drive 21, drives an upper sprocket wheel 22 fast on the ends of a further horizontal shaft 23 also extending between the side plates 18. Mounted on each horizontal shaft 23 is a pair of rubber rollers 24 having serrated peripheries.

The integers 17–24 just described constitute the main integers of a keg-receiving cradle.

Extending upwardly from one side of the frame is an arm 30 having a roller 31 mounted on its uper end and adapted, as will be described hereinafter, to rotate in the same plane as the keg K. A micro-switch 32 is mounted on the arm 30 adjacent to the roller 30, said arm being capable of pivotable movement, in the direction of the double-headed arrows in FIG. 3, about an axis 30' through the intermediary of an air-cylinder 33.

Similarly, but extending upwardly from the opposite side of the frame, is a further arm 35 having a suction cup 36 mounted on its upper end with an adjacent micro-switch 37. The arm 35 is also pivotable (in the direction of the double-headed arrow) at 35' to the frame 1 by means of an air cylinder 38.

An air cylinder 40 (see FIG. 4) mounted on a casing 41 surrounding the shaft 9 has a rack 42 connected to it and this rack cooperates with a pinion 43 mounted on the underside of the U-shaped bracket 17.

A pair of back-to-back vertically mounted air cylinders 50 (only one being shown in FIG. 4) is indirectly connected at the upper ends through a pair of yokes (not shown), mounted on opposite sides of the U-shaped bracket 17, to the underside of the latter.

OPERATION

Figure 6:
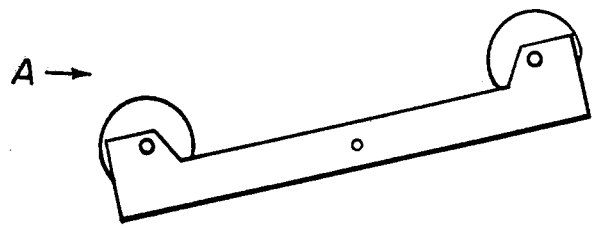
FIG. 6 is a diagrammatic view of the cradle in its keg receiving position.

The keg cradle is normally in its keg receiving position shown diagrammatically in FIG. 6 i.e. downwardly and facing the path of travel A of the keg and its direction of entry with the arms 30 and 35 being normally pivoted outwardly so as to permit the cradle to receive a keg.

KEG ENTERING CRADLE RIGHT WAY ROUND

Assuming that the keg enters the cradle in the correct position for the cradle to eject it (without futher positioning) to the keg de-bunging apparatus described and illustrated in the abovementioned U.S. Pat. No. 3,906,610, said keg will trip a limit switch 55 (FIG. 5) pivotally mounted on the inner face of the cradle. This actuates the air cylinders 50 to rock the cradle from the keg-receiving position (FIG. 6) to a mid or neutral position shown in FIG. 4, whereupon first time delay relay (not shown) will actuate the air cylinders 33, 38 causing the arms 30, 35 to pivot inwardly towards the keg whereby the cup 36, when a vacuum is applied thereto by air cylinder 38, will suck the plastic disc D from the end of the keg where it was previously applied by the brewer.

Figure 7:
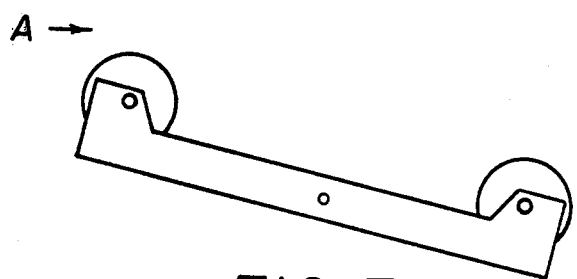
FIG. 7 is a diagrammatic view of the cradle in its keg ejecting position.

The said first time relay then causes the arms 30, 35 to move outwardly to their normal non-operative position and energized the air cylinders 50 to rock the cradle from its mid-position (FIG. 4) to the keg-eject position of FIG. 7 whereby the keg will be ejected, sans disc, from the cradle of the present invention into the cradle of the de-bunging apparatus of U.S. Pat. No. 3,906,610.

It will be appreciated that it is preferable for the ejected keg to enter the cradle of the de-bunger in such a position that the bung to be removed by the auger will be located substantially above said auger; if not, it would be necessary to rotate the keg until such a position had been reached (even as much as nearly 360°) before the augering cycle could commence.

However, the present invention solves this problem in a novel way. This is achieved through the cooperation of the roller 31 on arm 30 and the bottom of the keg. Hence, in pivoting the arm 30 inwardly, should the roller strike any part of the well W this will effectively prevent any further inward pivoting of the arm and the operator will be assured that when the de-bunging cradle receives the keg, the bung will be located substantially over the auger.

However, should the roller not strike the well W the arm 30 will continue to pivot inwardly until the roller strikes any other part of the dished bottm of the keg. Said further movement of the arm 30 energizes a second double relay (also not shown) to actuate motor 4 and through drive 5, 8, 9, gears 14 and 15, chain drive 21 rotates the rubber rollers 24 to rotate the keg about its central longitudinal axis until the well W strikes the roller whereupon the first time relay will cause the arms 30, 35 to move outwardly to their normal non-operative position and energizes the air cylinders 50 to rock the cradle from its mid-position and eject the keg into the de-bunger cradle where it will be in the correct position with the bung located substantially over the auger.

KEG ENTERING CRADLE ARSEY TARSEY

Assuming that a keg enters the cradle of the present invention "arsey tarsey" i.e. where the disc D faces the roller 31 and the well faces the cup 36, the pivoted limit switch 55 would again be tripped by the keg and the arms 30, 35 would pivot inwardly towards the ends of the keg.

The keg would again be rotated about its central longitudinal axis by the drive rollers 24 until it has been rotated substantially 360° whereupon a limit switch 65 (FIG. 3) mounted on the side of the frame enables a further set of timed contacts (not shown) to open thus causing the arms 30, 35 to pivot outwardly and stopping the drive to the rollers 24. When this occurs, the timed contacts energize a solenoid valve (not shown) which, in turn, actuates the air cylinder 40 to which the rack 42 is connected. This causes pinion 43 to rotate the U-shaped bracket 17 carrying the cradle through 180° thereby rotating the keg through 180° about its vertical axis whereby the disc D will be oriented with respect to the cup 36 and the well W with the roller 31.

Thereupon, the same procedure as that described above with a normally oriented keg will take place i.e. the disc D will be removed and the keg rotated until the bung is located in the correct position prior to the keg being transferred from one cradle to the other.

Obviously, the keg orienting and transferring apparatus will be timed with the de-bunger so that as one keg is being de-bunged, the next succeeding keg is having its disc removed.

I claim:

1. Apparatus for orienting and transferring a keg having differently shaped ends, said apparatus including
   a. a cradle receiving a keg with its central longitudinal axis disposed in a horizontal plane;
   b. means for rocking said cradle from a keg-receiving position, to a neutral position and from the latter to a keg-ejection position;
   c. means for rotating the keg in the cradle about its said axis;
   d. first and second means engagable with said keg ends, said first means being capable of removing an object from one end of said keg and said second means controlling said rotation; and
   e. selectively operable means for rotating said cradle and said keg through 180° about a vertical axis.

2. Apparatus according to claim 1 wherein the cradle rotating means are selectively operated by said second means.

3. Apparatus according to claim 2 including drive means selectively operable to actuate said keg rotating means and said cradle rotating means.

4. Apparatus according to claim 2 including a machine frame and wherein the cradle rocking means include at least one air cylinder connected to said cradle which is pivotally mounted on said frame; said cylinder, upon activation, causing said cradle to rock about its pivot.

5. Apparatus according to claim 2 wherein the cradle rotating means include pairs of spaced drive rollers rotatably mounted on said cradle and adapted to support said keg.

6. Apparatus according to claim 5 wherein each pair of rollers is provided with a drive.

7. Apparatus according to claim 1 wherein said first means includes a pivoted arm and a suction cup connected to a suitable source of pneumatic pressure; said arm being pivotable inwardly towards the end of the keg bearing said object and to contact the latter.

8. Apparatus according to claim 7 including a projection on the other end of the keg remote from said object and wherein said second means includes a pivoted arm and a roller mounted on the end thereof, said roller being adapted, when its associated arm is pivoted inwardly, towards the keg's said other end, to contact the latter.

9. Apparatus according to claim 8 wherein should the roller not strike said projection, said keg rotating means are actuated to rotate said keg upon said cradle until said projection is struck by said roller whereupon said keg rotating means are de-activated.

10. Apparatus according to claim 9 wherein, upon said de-activation, both of said arms pivot outwardly and said cradle rocking means are activated to rock the cradle from its neutral position to its keg-ejecting position.

11. Apparatus according to claim 8 wherein upon the roller striking the projection, said arms pivot outwardly away from the ends of the barrel and said cradle rotating means are activated.

12. Apparatus according to claim 11 wherein, upon said cradle rotating through 180°, said arms again move inwardly to contact the ends of the keg, said keg rotating means are activated and, subsequently, said arms again pivot outwardly to permit said cradle rocking means to be activated and to rock the cradle from its neutral position to its keg-ejecting position.

* * * * *